United States Patent [19]

Fenner

[11] Patent Number: 4,518,179
[45] Date of Patent: May 21, 1985

[54] TEST STOP ASSEMBLY FOR OXYGEN BOX DOOR

[75] Inventor: James A. Fenner, Renton, Wash.

[73] Assignee: The Boeing Company, Seattle, Wash.

[21] Appl. No.: 474,653

[22] PCT Filed: Dec. 9, 1982

[86] PCT No.: PCT/US82/01719
§ 371 Date: Dec. 9, 1982
§ 102(e) Date: Dec. 9, 1982

[87] PCT Pub. No.: WO84/02279
PCT Pub. Date: Jun. 21, 1984

[51] Int. Cl.³ .............................. E05C 3/08
[52] U.S. Cl. .................... 292/166; 292/DIG. 65; 292/201
[58] Field of Search ............ 292/126, 127, 201, 221, 292/DIG. 65, 8

[56] References Cited

U.S. PATENT DOCUMENTS

| | | | |
|---|---|---|---|
| 2,047,401 | 7/1936 | Whitted | 292/221 X |
| 2,592,274 | 4/1952 | Groeger | 292/341.18 X |
| 3,677,591 | 7/1972 | Waldo | 292/221 |
| 3,942,828 | 3/1976 | Bourrie et al. | 292/201 |

Primary Examiner—Richard E. Moore
Attorney, Agent, or Firm—Hughes, Barnard & Cassidy

[57] ABSTRACT

A test stop assembly (40) for cooperative engagement with an oxygen box door (14) and an actuatable latching mechanism therefor (24) is comprised of a mounting member (42) for securing the assembly in proximate engagement with an actuator member (44) for the latching mechanism; a reciprocable, selectively rotatable stem (46) received within a barrel (48) on the mounting member; a biasing member (68) for maintaining the stem intermediate upper and lower limits of travel in a static, normal position; an eccentric stop member (86) borne upon the distal end of the stem disposed for projection into a mating aperture (92) in the door; a longitudinal guide slot (74) and a transverse guide slot (76) for receiving a guide tab (82) on the stem; and a pivotal latching lever (94) disposed intermediate the actuator and the latching mechanism for transferring an unlatching force from the actuator to the latch to open the door and for transferring a reset force from the eccentric stop member to the actuator in order to reset the latter.

9 Claims, 9 Drawing Figures

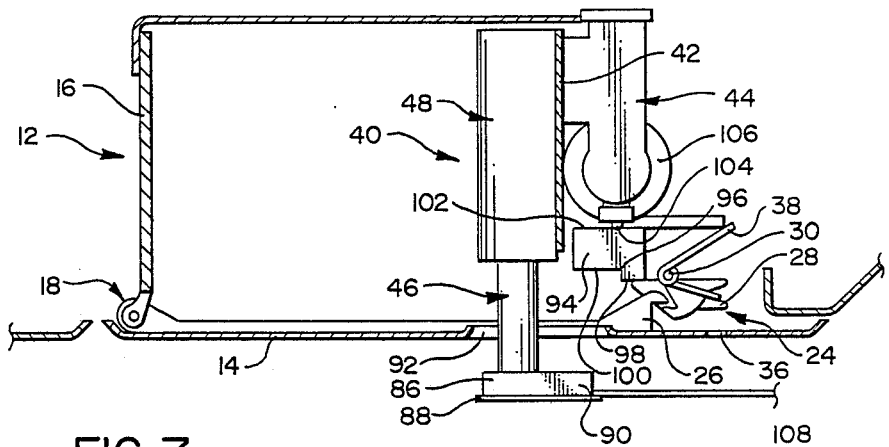
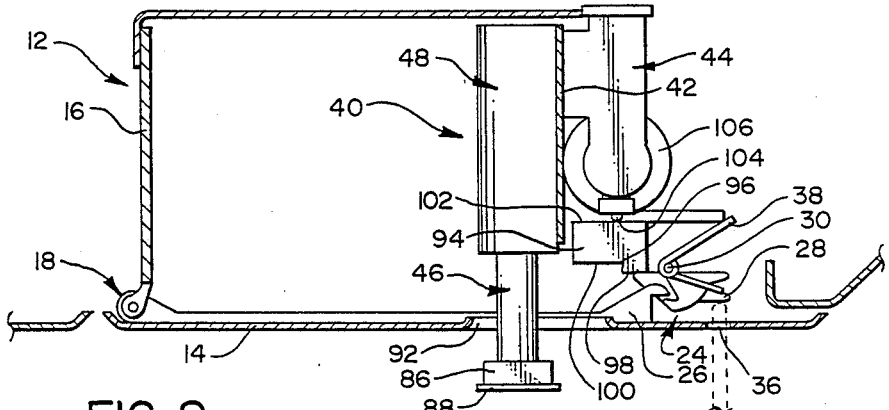
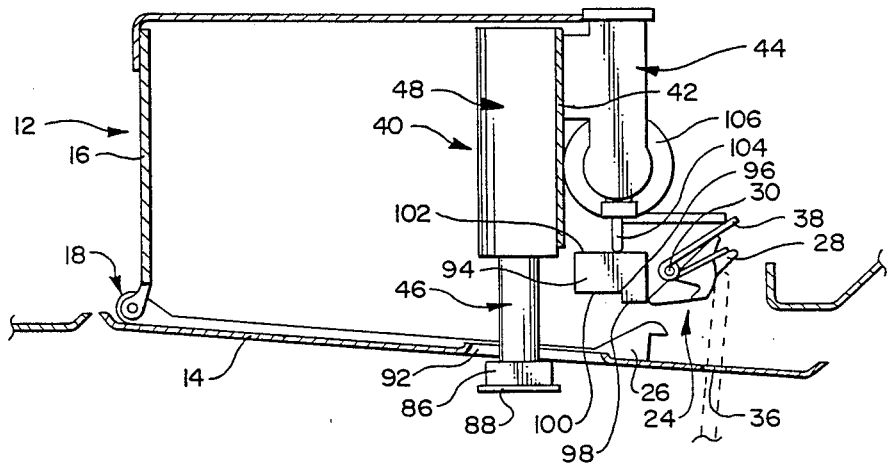

TEST STOP ASSEMBLY FOR OXYGEN BOX DOOR

DESCRIPTION

TECHNICAL FIELD

The present invention relates to an assembly for testing the emergency oxygen system of an aircraft and, more especially, to an improved test stop assembly for facilitating the periodic testing of oxygen box doors. The present test stop assembly provides three modes of operation—a normal mode permitting the oxygen box door to be opened in the event of emergency conditions on the aircraft, a test mode which allows the oxygen box door to be opened only partially in order to test for proper operation thereof, and a reset mode for returning the actuator for the oxygen box door to its appropriate configuration following a test.

DESCRIPTION OF THE BACKGROUND ART

Commercial aircraft are equipped with oxygen supply systems to be used by passengers under certain emergency conditions which have the potential of ocurring during flight. Conventionally, each seating row within the passenger compartment of an aircraft is provided with a so-called oxygen box, housing individual masks for the passengers occupying the respective seats associated with the system and a suitable supply of oxygen to those masks. The entire box is closed from the seating area by a door latched for pivotal disengagement upon actuation by a control system or a member of the flight crew; whereupon the door opens allowing the masks to drop and permitting oxygen to flow therethrough.

While the conventional oxygen supply system for commercial aircraft is a relatively straightforward assembly, many subleties attend its proper operation. For example, it is desirable to prevent passenger access to the system during normal flight conditions, yet the system must remain in a constant state of readiness should the need for its use arise. Periodic testing to insure such readiness is a mandated requirement somewhat antagonistic to the objective of individual inaccessibility. One approach to testing is simply actuation of the oxygen box array within the craft via the control system at appropriate intervals. However, the disadvantage of that type of direct approach is the collateral requirement of manually resetting each of the masks and oxygen box doors once the testing is complete. This can be both a time-consuming and tedious endeavor when one considers the numbers of oxygen box doors within even a single, large commercial aircraft, compounded by the frequency of testing and the number of aircraft involved. In an effort to obviate partially those drawbacks, several shortcuts have been adopted. For example, elastic cords or tape have been utilized to prevent complete opening of the oxygen box doors upon a test, permitting only partial opening to observe the proper actuation of the latching and release mechanisms. While this overcomes the need to reinsert masks within the oxygen box compartment itself, nonetheless the need to reset each actuator mechanism remains a significant task.

A commercial device has been introduced to improve upon the facility of testing oxygen box doors without the need to restort to elastic straps or masking tape in an effort to retard complete opening during a testing mode. That stop assembly is comprised of a reciprocable, rotatable stem having an offset test stop head at the distal end thereof. The head is usually in the form of a rectangular member mounted to the end of the stem in an offset fashion. The stem is secured by a mounting fixture within the oxygen box with the test head projecting downwardly into an aperture in the oxygen box door. The aperture is likewise generally rectangular having only a slightly oversized dimension as respects that of the test head. In normal operation, the test head resides within the aperture flush or generally flush with the face of the door to prevent passenger manipulation thereof. However, when a test of the system is required, a flat instrument may be inserted to engage a flange on the test head, draw the stem downwardly and rotate the same to present the stop member beneath the oxygen box door and, by virtue of the offset disposition of the stop head and stem, prevent the door from opening completely upon actuation of the system. The device is returned to a normal or operating configuration simply by rotating the stem and allowing the test head to retract within the aperture on the box door once the same has been reset. While a significant stride from the use of masking tape or elastic cords for this purpose, this commercial device nonetheless fails to account for the need to reset the actuating mechanism for the oxygen box door. Accordingly, the need exists for an improved test stop assembly which maintains the benefits of facilitating the testing of oxygen box doors, but one which further facilitates the ability to reset the actuating mechanisms thereof.

SUMMARY OF THE INVENTION

The present invention advantageously provides an improved test stop assembly for an oxygen box door which cooperates with both the latching mechanism of the door and the actuator therefor. The test stop assembly of the present invention maintains the benefit of conceptually similar devices heretofore in use, partially obstructing the opening of the door upon a test in order to eliminate the need for manual reinsertion of masks upon conclusion of the test, and then offers the further advantage of providing a simple yet efficient means for resetting the actuator mechanism responsible for deployment of the oxygen box doors. These, and other, advantages are realized in a test stop assembly mounted in proximate engagement with the actuator for the box latching mechanism and the latching mechanism itself; a reciprocable, selectively rotatable stem received on the mounting member; a biasing member for maintaining the stem intermediate upper and lower limits of travel in a static, normal position; an eccentric stop borne upon the distal end of the stem and disposed for projection into a mating aperture in the door, which aperture has a complementary geometric configuration with respect thereto, such that the eccentric stop is generally flush with the surface of the door in a normal mode, may be extended downwardly through the aperture and rotated to an offset or eccentric position in a test mode, and may be retracted upwardly into proximate engagement with the actuator in a reset mode. In the preferred implementation, the assembly includes a latching lever disposed for pivotal motion along an arcuate path intermediate the actuator and the latch. The latching lever includes three abutment surfaces, one for contacting the latch, one for contacting the actuator, and one for contacting the eccentric stop. In that manner, force from the actuator is transmitted to the latch in order to operate the oxygen box doors, either for testing or during an emergency, while a reset force upon depression of the eccentric stop in a reset mode is transmitted through the latching lever to the actuator for the system.

The stem member of the instant assembly is received in the bore of a barrel which is further provided with guide slots configured to assist in the proper positioning of the stem during its manipulation between or among modes of operation. The barrel includes a first longitudinal slot for guiding the stem along an axial path and a transverse slot for guiding the stem during rotation. The stem itself includes a guide tab which projects within the guide slots, prohibiting rotational movement of the stem when the tab resides in the axial guide and prohibiting longitudinal movement of the stem when the tab resides in the rotational guide.

In operation, the assembly is maintained in a normal mode or configuration with the eccentric stop head located within the aperture in the door substantially flush with the surface thereof, that position being maintained by the biasing on the stem. The testing configuration is achieved by withdrawing the eccentric stop downwardly through the aperture in the door until the guide tab reaches the juncture between guide slots defining a lower limit of travel, and thence rotating the stem to present an abutment surface disposed beneath a portion of the door. Actuation of the latching mechanism opens the door, which drops to a partially opened position in engagement with the eccentric stop thereby providing a visual indication of the functioning of the oxygen box door while precluding a deployment of contents of the box. Following that, the door is relatched and the eccentric stop rotated and allowed to return to the normal configuration under the influence of the biasing member. Thence, upward depression of the stop causes engagement with the latching lever, in turn resetting the actuator mechanism. Release of the force again allows the stop head to resume its normal position within the aperture leaving the system in a state of readiness.

Other advantages of the present invention, and a fuller appreciation of its mode of construction and operation, will be gained upon an examination of the following detailed description of preferred embodiments, taken in conjunction with the figures of drawing.

BRIEF DESCRIPTION OF THE DRAWINGS

FIG. 6 is a transverse sectional view, similar to FIG. 5 but showing the initial stages of a test mode for the oxygen box door, where the test stop assembly of the present invention has been manipulated to retract a stop member;

FIG. 7 is a transverse sectional view similar to FIG. 6, at a subsequent stage in the test mode where the test stop assembly of the present invention has been manipulated to a test position prior to release of the latching mechanism for the oxygen box door;

FIG. 8 is a transverse sectional view like FIGS. 6 and 7, but showing the latch for the oxygen box door in a released position allowing that door to open partially and rest in engagement with the test stop assembly of the present invention; and, FIG. 9 is a transverse sectional view like FIGS. 5-8, but showing the oxygen box door in its closed and latched position and the test stop assembly of the present invention in the reset mode.

DETAILED DESCRIPTION OF THE INVENTION

The present invention relates, generally, to devices for facilitating the testing of the emergency oxygen system of a commercial aircraft and, more especially, to an improved test stop assembly adapted for use in testing the proper functioning of oxygen box doors associated with such a system. Accordingly, the invention will now be described with reference to certain preferred embodiments within that context; albeit, those skilled in the art will appreciate that such a description is meant to be exemplary only and should not be deemed limitative.

Figure 1:
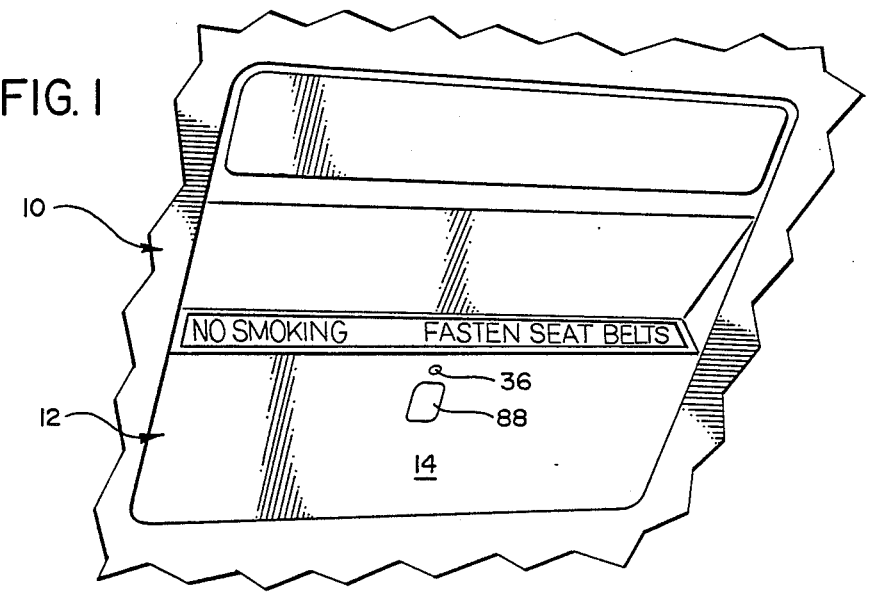
FIG. 1 is a fragmentary, perspective view of an overhead portion of a passenger seating row in a conventional commercial aircraft, showing an oxygen box in its normal environment.

Turning to the figures of drawing, in each of which like parts are identified with like reference numerals. FIG. 1 illustrates a portion of the overhead panel, designated generally as 10, of a passenger seating row in a commercial aircraft. As is customary, the overhead panel includes illuminated legends operated during flight by a member of the flight crew proximate which, in this exemplary showing, is an oxygen box designated generally as 12. The typical oxygen box contains a plurality of masks connected via suitable conduit to an oxygen supply which itself may be housed within the oxygen box or routed thereto via a central distribution system from a remote location within the craft. Irrespective of that feature, the box is maintained in a normally closed position by a door 14 to render the interior and its contents inaccessible by passengers during normal flight conditions. The door 14 in the illustrative embodiment shown (typical of a conventional construction) depends from a rear wall 16 of the box 12 in pivotal engagement therewith about a hinge member 18. The hinge 18 is shown here to be comprised of a plurality of corresponding apertured ears 20 formed on the door and rear wall of the box 12 and through which a cooperative pin 22 is inserted. The door 14 is secured to the box 12 by a releasable latch means 24 disposed within the recess area of the box 12 to prevent inadvertent opening of the box or tampering therewith. In the illustrated embodiment, the latch 24 is comprised of a latch bar 26 secured to the door 14 for mating engagement with a pivotal latch bar 28 disposed along the front wall of the box 12; shown in this case to be pivotal about a hinge member 30 constructed in the same manner as the hinge 18. The pivotal latch bar 28 is preferably provided with a central release tab member 32 and may optionally, but preferably, includes outer release tabs 34 as well. The pivotal latch bar 28 also preferably includes a biasing spring member 36, best viewed for example in FIG. 5, urging the pivotal latch into a normally closed configuration in engagement with the fixed latch bar on the door 14. When it is desired to deploy the system, either during an emergency situation or, more routinely, for purposes of testing the same, the application of a downward pressure on the forward portion of the top edge surface of one of the release tabs (or rearward portion of the lower edge surface), and usually the central release tab 32, pivots the bar 28 about its hinge 30 disengaging that bar from the fixed bar 26, whereupon the door 14 itself pivots to an open position allowing the masks within the box 12 to drop by gravity. Heretofore, a resettable actuator in the form of a solenoid-driven pin applied that downward pressure upon a command from either a detector system within the craft or via a switch controlled by a member of the flight crew.

As noted in capsule sum above, periodic testing of the oxygen boxes 12 in a commercial aircraft has been a tediuos and time consuming chore. Actuation of the system results in the deployment of the oxygen masks which, upon completion of the test, must be manually rolled and reinserted within the interior of box 12. Where the overall system is tested via a central control for the actuating members, those actuators must then each be reset as well. In the past, some limited testing of the system was achieved by inserting a small pin through an aperture such as the one identified as 36 in FIG. 1 and, e.g., FIG. 8 into contact with the pivotal latch bar 28 at one of the release tabs 32 or 34 simply to insure the door 14 would open without the need to fire the solenoid actuator thereby avoiding the need for resetting the same. However, that will not ordinarily suffice for the requirement of a thorough testing which includes the central actuation system itself. A test stop assembly in accordance with the present invention, designated generally as 40, facilates the necessary task of testing the oxygen box assemblies while eliminating the tedium of prior approaches in respect thereto.

Figure 3:
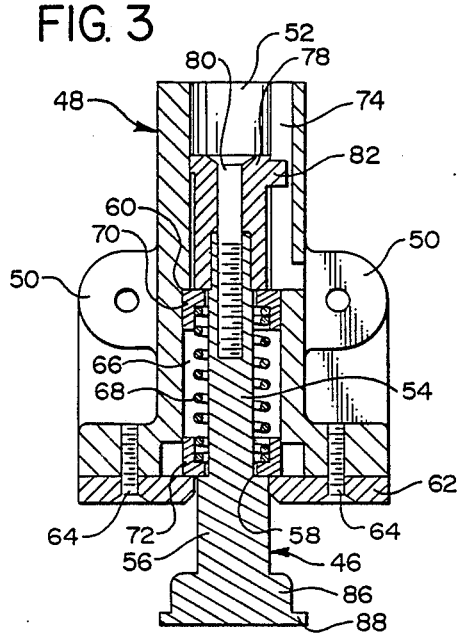
FIG. 3 is a sectional view, taken substantially along the line 3—3 of FIG. 2, showing the internal structure of a test stop assembly in accordance with the present invention.
Figure 4:
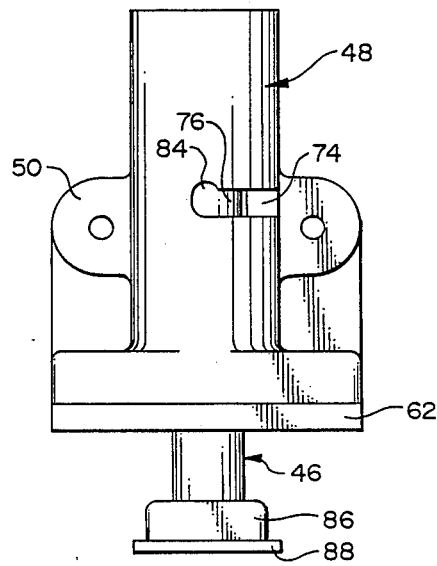
FIG. 4 is a view taken substantially along the line 4—4 of FIG. 2, showing the test stop assembly in side elevational.
Figure 5:
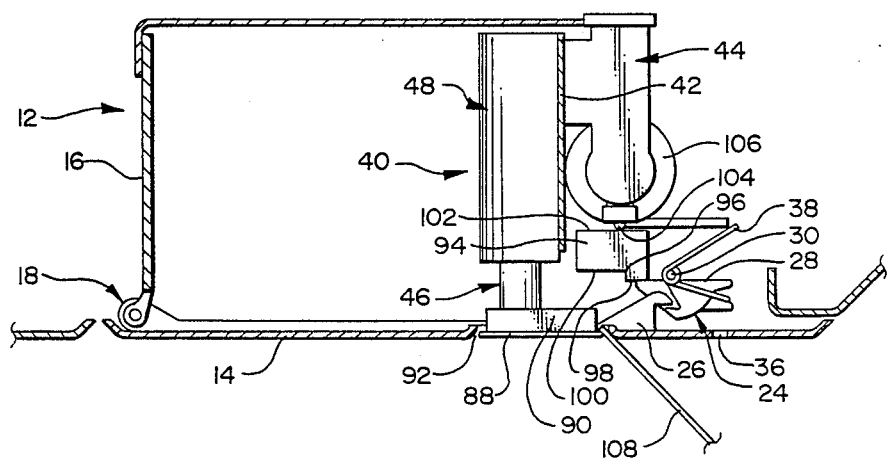
FIG. 5 is a transverse sectional view taken substantially along the line 5—5 of FIG. 2, showing the interior of an oxygen box (with contents omitted for the sake of clarity) and a test stop assembly in accordance with the present invention, illustrating the normal mode of cooperation between these parts.

The test stop assembly 40, best viewed in FIGS. 3-5, is supported upon a mount 42 within the interior of the box 12 for proximate engagement with an actuator means 44 and the latching assembly for the door 14. The test stop assembly 40 is comprised of a reciprocable, selectively rotatable stem designated generally as 46 received within a barrel designated generally as 48 secured to the mount 42 through fixture lobes 50 and appropriate fasteners. The barrel 48 includes an axial bore 52 within which the stem 46 may reciprocate among three general positions corresponding to a normal mode, a test mode, and a reset mode, as described more fully hereinabelow. The stem 46 is preferably a stepped stem having a proximal end 54, expanding to an enlarged shank at its distal end 56 across a step 58. The bore 52 of barrel 48 is likewise stepped, having an inner dimension at its proximal end less than that at its distal end defined across a step 60. The lower end of the barrel member 48 is provided with a closure plate 62 secured thereto by suitable fasteners 64. Accordingly, a cavity 66 is defined by the disparity in dimensions resulting from this stepped geometry, as seen best in FIG. 3. A biasing member, such as a biasing spring 68, is disposed within the cavity 66, for maintaining the stem 46 in aa static, normal position while nonetheless allowing the same to reciprocate between an upper and lower limit of travel during transitions among the various modes for the test stop assembly 40. Upper and lower sliding spacer members 70 and 72, respectively, each shown to be in the form of a flanged washer in this exemplary embodiment, receive the spring 68 and cooperate therewith to apply the biasing forces on the stem during its reciprocable travel. The barrel 48 further includes a longitudinal guide slot 74 formed internally of the bore 52 which terminates at a transverse guide slot 76 as best viewed in FIGS. 3 and 4; which guide slots respectively assist in confining motion of the stem to axial movement over the upper and lower limits of travel and rotational motion once the latter has been reached.

The stem 46 is disposed for this limited reciprocable motion with the barrel 48 and selective rotation in order to be manipulated to various positions depending upon the mode of operation of the device. A guide member 78 is secured to the proximal end 54 of the stem by means of a fixture member 80 for cooperation with the guide slots 74 and 76 during that operation. As best viewed in FIG. 3, the guide member 78 includes a blind recess within which the end of stem 46 is received near its lower end and then merges outwardly at a slight flange near its upper end to conform generally to the inner dimensions of the bore 52. A guide tab 82 is included at the upper end of the guide member 78, projecting outwardly therefrom for sliding engagement within the guide slots 74 and 76. Accordingly, the guide tab 82 when disposed within the longitudinal slot 74 permits axial reciprocation of the stem upwardly to the limit provided by the enlarged shank 56 and downwardly to the limit defined at the point of contact between that tab and the end of the slot (i.e., the juncture between slots 74 and 76), while precluding rotational motion of the stem within the barrel. At that lower limit of travel where the tab 82 reaches the end of slot 74, rotatable movement of the stem 46 is now achieved via the transverse guide slot 76. Optionally, but preferably, a slight enlargement 84 is made at the terminus of guide slot 76 to function cooperatively with the tab 82 as a detent to maintain the stem in the rotated position.

The extreme distal end 56 of the stem 46 includes an eccentric stop member, here in the form of expanded stop head 86 which terminates in a peripheral flange-type skirt 88. Looking to FIGS. 3-5 (collectively), the head 86 is a generally rectilinear head secured in an offset fashion with respect to the stem 46 presenting, thereby, an abutment surface 90 best viewed in FIG. 5. The head 86 is configured for disposition within an aperture 92 formed in the door 14; which aperture is of complementary geometric configuration with respect to the head and of a dimension only slightly greater than the skirt 88. Consequently, the head 86 as shown, e.g., in FIG. 5, remains normally flush with the surface of the door 14 but is capable of projecting therethrough as described below.

Figure 2:
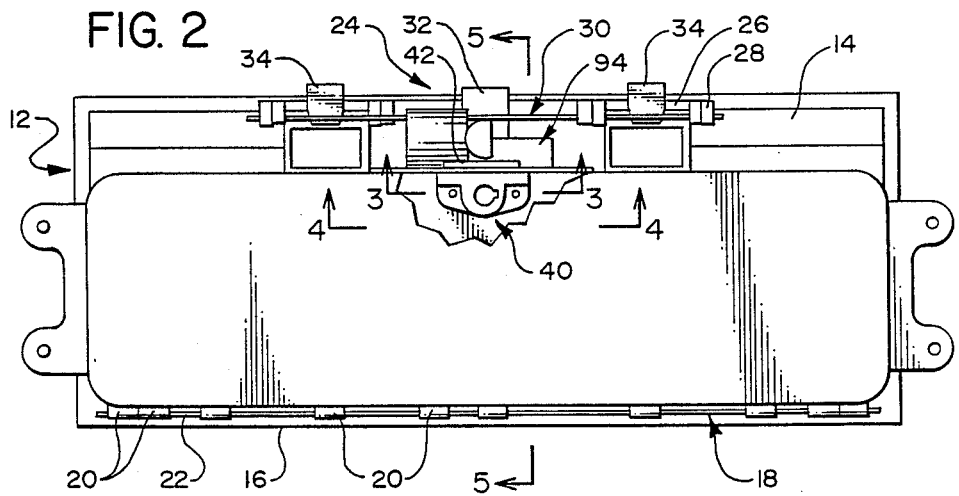
FIG. 2 is a top plan view, with parts broken away for the sake of clarity, showing an oxygen box incorporating a test stop assembly in accordance with the present invention.

The test stop assembly 40 further includes a latching lever means designated generally as 94 and best viewed in FIGS. 2 and 5. The latching lever 94 is preferably pivotally disposed on the mount 42 for arcuate movement intermediate the actuator means 44 and the latch assembly. In the preferred form shown, the lever 94 is stepped at 96 to yield a first contact or abutment surface 98 for engagement with the pivotal latch bar 28 and, most preferably, the central release tab 32, and a second leg having a contact or abutment surface 100 disposed for engagement with the abutment surface 90 of the eccentric stop upon upward depression of the head 86, as best viewed in FIG. 9. A top surface 102 of the lever 94 provides yet another contact surface, this for engagement with a pin 104 of the actuator 44 which is disposed for downward driving motion upon a command to a solenoid 106. The pin 104 is customarily a spring-loaded pin disposed within a barrel of the actuator 44 and the latched therein against the biasing force by solenoid 106. When the solenoid is energized, the pin is released and the biasing spring drives same downwardly against the latching mechanism to open and deploy the door 14.

The operation of the assembly 40 is best envisioned with reference to FIGS. 5–9. FIG. 5 illustrates the normal mode for the assembly vis-a-vis the oxygen box 12. The biasing spring 68 maintains the stem in an intermediate position in this normal mode, presenting the surface of the skirt area 88 flush with the surface of door 14 and nestled within the aperture 92. Hence, the interior of box 12 remains inaccessible to passengers and likewise remains secure against inadvertent opening. When it is desired to test the operational characteristics of the system, a thin, flat tool 108 may be inserted within the very slight gap about the skirt 88 in order to retract the stem 46 to the position of FIG. 6, whereupon the head 86 may be grasped. The stem is retracted to the limit allowed by the travel of guide slot 74 in cooperation with the guide tab 82. Thence, the head is turned and the stem 46 rotated with the tab 82 guided within the slot 76 to present same within the detent 84. Concomitantly, the abutment surface 90 is now presented beyond the area of aperture 92 due to the offset or eccentric relationship of the head on the stem 46. The latching mechanism for the door 14 may now be opened, either by actuator 44 or by the insertion of a pin-like tool through aperture 36, as shown in phantom lines in FIG. 7. In either event, the door 14 will drop to the point permitted by the head 86, thereby preventing complete deployment and maintaining the contents of the oxygen box 12 therein. Upon completion of the test, the door may be repositioned with the latching mechanism in its closed and locked configuration and the stem/stop head member returned to its normal configuration. That is very simply achieved by merely rotating the head to present the guide tab 82 within the longitudinal slot 74 allowing the biasing spring 68 to return the stem to its normal position.

Figure 9:
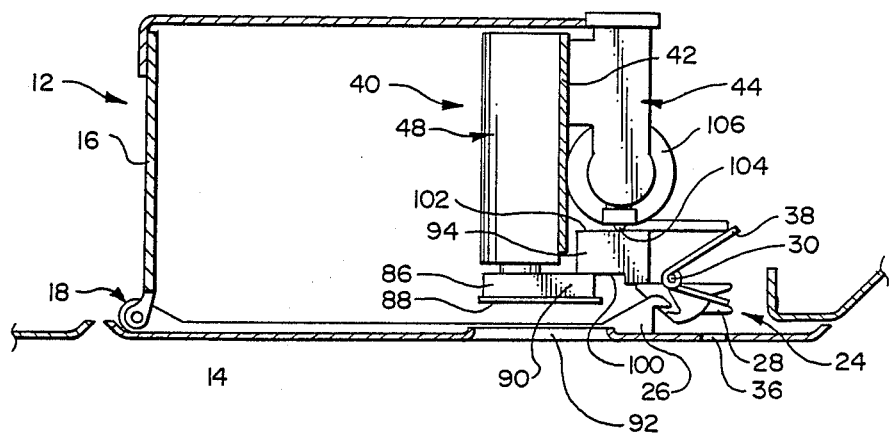

In those situations where the pin tool is utilized to disengage the latching mechanism, return of the stem and stop head to the normal configuration as immediately aforesaid concludes the testing procedure. However, in those situations where the actuator 44 is employed, and the pin 104 fired to disengage the latch, the actuator requires manual resetting. The reset mode for the assembly 40 is illustrated in FIG. 9. With the stop head 86 in its normal mode, as best envisioned with reference to FIG. 5, the stem may be depressed upwardly through the aperture 92 against the biasing spring force, during which time the guide tab 82 rides within the slot 74. As the stem is pushed upwardly within the barrel, the abutment surface 90 contacts the cooperative surface 100 of the latching lever 94 which lever, in turn, pushes the pin 104 within the barrel of actuator 44 to the reset position. Once that step is complete, removing force on the stop head 86 allows the biasing spring to return the assembly to the normal configuration, thereby concluding the testing procedure and resetting the system for use.

The straightforward simplicity of the assembly 40 not only renders the same highly efficient and reliable in use but, as a correlary, simplifies fabrication methodology.

In the highly preferred embodiment shown, the components are very easily molded form an appropriate polymeric material into the desired shape. It is also highly preferred to form the stem and stop head (save the skirt 88) from a colored (e.g., red) polymer in order that the same may serve as a visual indication that the device is in a test mode.

While the invention has now been described with reference to certain preferred embodients thereof, those skilled in the art will appreciate that various substitutions, modifications, omissions, and changes may be made without departing from the spirit thereof. Accordingly, it is intended that the foregoing description be viewed as exemplary of the preferred implementation(s) and not be deemed limitative.

I claim:

1. A test stop assembly particularly adapted to be used with an oxygen box door and an actuable latching mechanism having actuating means for the door, said assembly comprising:
   a. mounting means for mounting the assembly proximate the actuating means of the latching mechanism;
   b. a stem means mounted in the mounting means for reciprocating movement along an axis of travel, said stem means having three positions along said axis, namely:
      1. a first normal intermediate position;
      2. a second extended test position;
      3. a third retracted reset position;
   c. biasing means operatively engaging the stem means to urge the stem means from the second and third positions to the first intermediate position;
   d. said stem means comprising an end stop means positioned at an end portion of the stem means, said stop means being shaped to fit in a mating aperture in the door when the stem means is in the first intermediate position so as to permit movement of the stem means inwardly from the door to the third retracted reset position, said stop means being arranged to be rotatable out of alignment with said aperture when the stem means is in the second extended test position, so that said stop means can be located in a door stopping position;
   e. said stem means having a reset portion positioned to engage the actuating means for the latching assembly when the stem means is moved to its third reset position.

2. The test stop assembly of claim 1, further comprising barrel means, including an axial guide means, said stem means being positioned in said barrel means for movement along its axis of travel.

3. The test stop assembly of claim 2, wherein said latching mechanism comprises latch means for the door and a resettable actuator member, said assembly further comprising latching lever means intermediate the actuator member and the latch means, the reset portion of said stem means having an abutting surface to engage the latching lever means when the stem means is moved to its third retracted reset position.

4. The test stop assembly of claim 3, wherein said abutting surface is formed on said stop means.

5. The test stop assembly of claim 4, wherein said stop means is comprised of a generally rectilinear head extending generally normal to said stem means, said head providing said abuttment surface thereon for supporting the door in the second test position and engaging said latching lever in the third reset position.

6. The test stop assembly of claim 5, wherein said stem means is a stepped, generally cylindrical stem received in a stepped bore of said barrel means with a cavity defined therebetween within which is disposed a spring comprising said biasing means, said barrel means including a longitudinal slot comprising said axial guide means and a transverse slot which comprises said rotation guide means, said stem having a tab which engages said longitudinal and transverse slots so as to properly position the stem means.

7. The test stop assembly of claim 2, wherein said stem means is a stepped, generally cylindrical stem received in a stepped bore of said barrel means with a cavity defined therebetween within which is disposed a spring comprising said biasing means, said barrel means including a longitudinal slot comprising said axial guide means and a transverse slot which comprises said rotation guide means, said stem having a tab which engages said longitudinal and transverse slots so as to properly position the stem means.

8. In an oxygen box assembly having a door hinged along one side and latched at an opposite side by a latching mechanism including a latch bar on the door and an interengaging latch bar on said box, said assembly further comprising a resettable, solenoid actuator having a latch release pin, a test stop assembly having a reciprocable, selectively rotatable stem with a stop member at one end of the stem, said stop member being positioned in an aperture in the door, with said stop member and said aperture having complementary geometric configurations, the improvement comprising:
  a. mounting means for positioning the test stop assembly proximate said latching mechanism;
  b. a latch actuating member mounted to said mounting means for movement between said latch bar on the door and the solenoid actuator, said latch actuating member having a first abuttment surface for contacting said latch bar on the door, a second abuttment surface for engagement with the stop member, and a third abuttment surface for contacting said release pin;
  c. a barrel having a bore receiving said stem, said barrel defining a cavity disposed circumferentially around said stem;
  d. biasing spring means disposed within the cavity for maintaining the stem at an intermediate position where the stop is positioned in the aperture in the door;

whereby said stop member is located within the aperture in the door in its intermediate position, projects beyond said aperture and beneath said door at a lower limit of travel, and can be depressed upwardly out of said aperture to an upper limit of travel in contact with the third abuttment surface of the latch actuating member for resetting said actuator.

9. The improvement as recited in claim 8, wherein said barrel includes a longitudinal guide slot and a transverse guide slot meeting at a common juncture and said stem includes an outwardly directed guide tab for guiding projection into engagement with said slots.

* * * * *